(12) United States Patent
Simon et al.

(10) Patent No.: US 8,829,415 B2
(45) Date of Patent: Sep. 9, 2014

(54) CORRELATION CONFOCAL MICROSCOPE

(75) Inventors: David Simon, Lynnfield, MA (US); Alexander Sergienko, Boston, MA (US); Lee Edwin Goldstein, Newton, MA (US); Robert H. Webb, Lincoln, MA (US)

(73) Assignee: Trustees of Boston University, Boston, MA (US)

( * ) Notice: Subject to any disclaimer, the term of this patent is extended or adjusted under 35 U.S.C. 154(b) by 255 days.

(21) Appl. No.: 13/534,600

(22) Filed: Jun. 27, 2012

(65) Prior Publication Data

US 2014/0008525 A1  Jan. 9, 2014

Related U.S. Application Data

(63) Continuation of application No. PCT/US2011/020186, filed on Jan. 5, 2011.

(60) Provisional application No. 61/292,519, filed on Jan. 6, 2010.

(51) Int. Cl.
*H01J 3/14* (2006.01)
*H01J 5/16* (2006.01)
*G02B 21/00* (2006.01)

(52) U.S. Cl.
CPC ........ *G02B 21/0004* (2013.01); *G02B 21/0084* (2013.01); *G02B 21/0056* (2013.01)
USPC ............................ 250/216; 356/904; 359/368

(58) Field of Classification Search
USPC ......... 250/216, 201.1, 201.2, 201.3; 356/904; 359/368
See application file for complete search history.

(56) References Cited

U.S. PATENT DOCUMENTS

| | | | |
|---|---|---|---|
| 5,866,907 A * | 2/1999 | Drukier et al. | 250/366 |
| 6,208,815 B1 | 3/2001 | Seidel et al. | |
| 6,775,009 B2 | 8/2004 | Hill | |
| 2002/0122246 A1 | 9/2002 | Tierney et al. | |
| 2008/0025462 A1 * | 1/2008 | Sutko et al. | 378/44 |
| 2009/0116707 A1 * | 5/2009 | Sutko et al. | 382/128 |
| 2009/0225409 A1 | 9/2009 | Ilev et al. | |

FOREIGN PATENT DOCUMENTS

| JP | 11-249023 A | 9/1999 |
|---|---|---|
| WO | 97-31282 A1 | 8/1997 |

\* cited by examiner

*Primary Examiner* — Francis M Legasse, Jr.
(74) *Attorney, Agent, or Firm* — BainwoodHuang

(57) ABSTRACT

A correlation confocal microscope uses correlated photon pairs to improve resolution. It employs a source of a light beam converging to a point location on a sample, and an objective that gathers light from the point location and generates an image beam. A modulator applies a spatial pattern of modulation to the source light beam to define spatially correlated photons whose spatial correlations are preserved in modulated light gathered from the sample. A filter applies a modulation-selective filter function to the image light beam to generate a filtered light beam of like-modulated photons. A coincidence detector detects temporally coincident photon pairs in the filtered light beam, generating a pulse output that indicates the magnitude of a light-detectable property (such as transmissivity or reflectivity) of the sample at the point location. The modulator may apply phase modulation and the filter may be a phase-sensitive component such as an interferometer.

13 Claims, 2 Drawing Sheets

CORRELATION CONFOCAL MICROSCOPE

STATEMENT OF GOVERNMENT RIGHTS

This invention was made with government support under Contract No. W911NF-05-1-0197 awarded by the Army Research Office. The US Government has certain rights in the invention.

BACKGROUND

The present invention is directed to the field of microscopy, and more particularly to the field of high-resolution scanning microscopy.

Scanning microscopes generally function by focusing electromagnetic energy at a point location of a sample, collecting reflected or transmitted energy from the interaction of the incident energy with the sample, and repeating the procedure at an array of points over an area of interest on the sample. Common examples of scanning microscopes include the scanning electron microscope, in which the electromagnetic energy is in the form of an electron beam, and the confocal microscope, in which the electromagnetic energy is typically in the form of light in the wavelength range from ultraviolet to infrared.

A standard confocal microscope employs both source and detection "pinholes" (tiny openings in otherwise opaque screens) along with optics in order to illuminate and image only a very small area of a sample confocal to the pinholes, thus providing high resolution. The source pinhole helps to filter out stray source light that would land outside the confocal area, and the detection pinhole filters out gathered light that emanates from outside the confocal area. Together, the two pinholes serve to pass light from a small in-focus area in the sample and block light from out-of-focus areas. The in-focus area is scanned over the sample, and an array of pixel values are obtained over the area in order to build up a two-dimensional image.

One variant of confocal microscopy, referred to as "two-photon" microscopy, takes advantage of the detectability of a pair of photons that are absorbed by a fluorescent molecule simultaneously. The rate of such absorption is related to overall photon density, which is higher toward the central part of an incident stream of photons, and thus the effective size of the confocal area is reduced.

Other techniques for improving resolution are known that rely on so-called "entangled photons", or photons having interrelated quantum states. Entangled photons may be generated by spontaneous parametric downconversion such as occurs in some nonlinear crystal materials for example. One example of this type of technique is referred to as "quantum microscopy".

SUMMARY

In conventional two-photon microscopy, photon correlation is introduced in the excitation of the sample that includes fluorescent molecules. In order to obtain sufficient output signal amplitude for processing, it may be necessary to use an undesirably high amplitude of incident light, which may damage the sample. In quantum microscopy and other types of entangled-photon microscopy, the requirement for entangled photons limits the types of light sources that can be used and may thus limit the widespread adoption and use of those techniques.

The present disclosure is directed to a correlation confocal microscope that uses correlated photon pairs to improve resolution while avoiding drawbacks of existing approaches such as two-photon and quantum microscopy. The microscope employs a source of a light beam converging to a point location on a sample, as well as an objective that gathers light from the point location of the sample and generates an image beam. The microscope includes a modulator located between the source and sample, preferably as close to the sample as possible. The modulator applies a spatial pattern of modulation to the source light beam to define spatially correlated photons of the source light beam by their equal modulation, and the spatial correlations are preserved in modulated light gathered from the sample. A filter applies a modulation-selective filter function to the image light beam to generate a filtered light beam of like-modulated photons. A coincidence detector detects temporally coincident photon pairs in the filtered light beam, generating a pulse output that indicates the magnitude of a light-detectable property (such as transmissivity or reflectivity) of the sample at the point location.

In one embodiment the modulator applies a spatial pattern of phase modulation, such as a Gaussian pattern having a peak or maximum at the optical axis and falling off as a function of distance away from the axis. The filter is a phase-sensitive component such as an interferometer. The interferometer selects phase-correlated photon pairs and rejects those photons that are not phase-correlated. The coincidence detector thus detects photon pairs that are both temporally and spatially correlated, achieving improved resolution over a standard confocal microscope.

While a source of entangled photons can be used, it is not essential. In one embodiment that makes use of phase modulation, a coherent laser source is employed; a nonlinear crystal converts the photons of the laser beam into entangled photon pairs with a fixed phase relation to each other. In this embodiment, the intersection of the beam with the crystal acts as an effective pinhole. However, in embodiments involving modulation properties other than phase, conventional incoherent light sources and actual source pinholes may be used, with no need for entanglement. Additionally, because photon pair selection is achieved by applying spatial modulation to the source light beam and then filtering the light gathered from the sample, the technique avoids the need for a higher intensity source such as may be required for standard two-photon microscopy.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
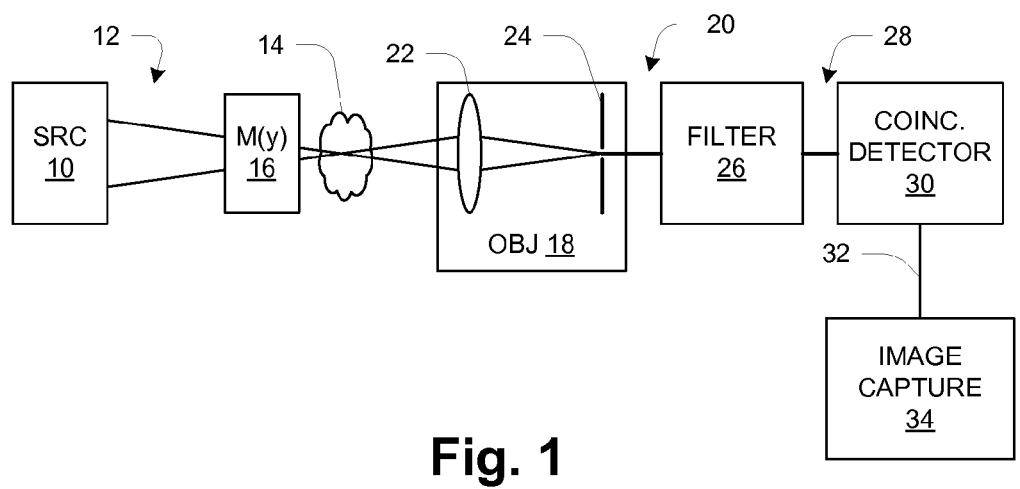
FIG. 1 is a schematic diagram of a correlation confocal microscope.

FIG. 1 shows a correlation confocal microscope in schematic form. A source (SRC) 10 generates a source light beam 12 that is focused to a point location on a sample 14. A spatial modulator 16 applies a spatial pattern of modulation (shown as M(y)) to the source light beam 12 in a way that defines spatially correlated photons of the source light beam 12 by equal modulation thereof. In one embodiment the modulation is phase modulation; details are discussed below. It is generally desirable that the spatial modulation be symmetric with respect to the optical axis, so that photons equidistant from the optical axis are modulated by the same amount. Thus, those photons having a certain degree of modulation are spatially correlated, i.e., they follow substantially similar spatial paths with respect to the optical axis.

An objective (OBJ) 18 gathers modulated light from the point location of the sample 14 and generates an image light beam 20. As shown, the objective includes an objective lens 22 and a pinhole screen 24 that is opaque everywhere except a tiny opening ("pinhole") where the light gathered from the sample 14 is focused. A filter 26 applies a modulation-selective filter function to the image light beam 20 to generate a filtered light beam 28 of like-modulated photons. A coincidence detector 30 detects temporally coincident photon pairs in the filtered light beam 28 and generates a pulse output signal 32 having a pulse for each detected coincident pair. The pulse rate and/or duty cycle are indicative of a light-detectable property of the sample at the point location (e.g., transmissivity or reflectivity). The pulse output signal 32 is provided to image capture electronics 34 that converts the pulse information to a pixel value. An image of a two-dimensional area of the sample 14 is obtained by scanning (i.e., moving) the source beam 12 and/or the sample 14 relative to each other and obtaining pixel values at an array of points over the area. Scanning components are omitted from FIG. 1 for clarity.

The spatial modulator 16 and filter 26 are complementary elements, i.e., the filtering performed by the filter 26 is based on modulation characteristics that are imparted by the spatial modulator 16. In one example described herein, the spatial modulator 16 applies phase modulation to an essentially monochromatic source beam 12, and the filter 26 is an interferometer or other phase-discriminating component. Some specifics for such an embodiment are described below. Other schemes are possible. For example, the spatial modulator 16 may apply frequency-based spatial modulation to a polychromatic source beam 12, while the filter 26 is a prism or other frequency-discriminating component. Note that it is assumed in these cases that the light-detectable property of interest is an amplitude-related characteristic such as transmissivity or reflectivity. If some other property of the sample is to be detected that is not strongly amplitude related (such as polarizing behavior, for example), then it may be possible to use amplitude modulation in the spatial modulator 16.

It will be appreciated that the source 10 and objective 18 provide the "confocality" of the microscope, i.e., if the modulator 16 and filter 26 are removed then the result may be a standard confocal microscope. These are already known to provide improved resolution based on their highly selective illuminating and light-gathering from a small point of a sample. The addition of a spatial correlation component can increase resolution even further by limiting the detection to photon pairs that are both spatially and temporally correlated.

Figure 2:
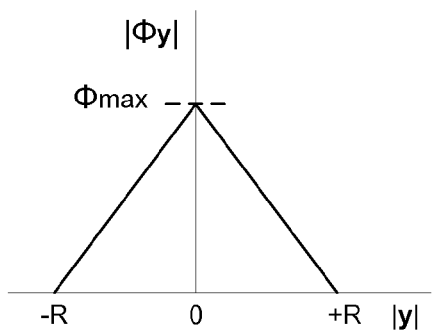
FIGS. 2 and 3 are graphs of spatial modulation patterns, specifically a magnitude of phase modulation as a function of distance from an optical axis.
Figure 3:
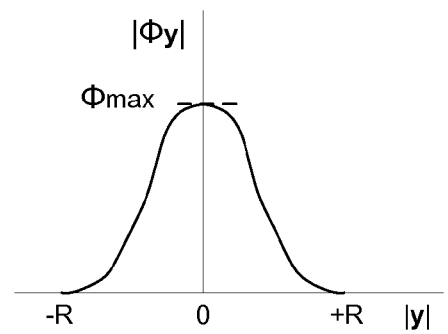

FIGS. 2 and 3 are graphs depicting examples of the spatial dependence of the modulation applied by the spatial modulator 16. FIG. 2 shows an example in which the phase delay φ(y) has a linear characteristic, having a peak value φmax at the optical axis (y=0) and diminishing linearly toward zero at a distance R from the optical axis (such that R represents the radius of a circular pattern transverse to the optical axis). It will be appreciated that the pattern may be inverted and/or translated vertically without loss of generality. FIG. 3 shows another example in which the phase delay φ(y) has a Gaussian characteristic. Other patterns are possible. Techniques for constructing optical components that can function as the spatial modulator 16 are generally known. For example, an optical thin film can be used with a spatially varying refractive index, achieved for example by a pattern of deposition, doping, or both.

Figure 4:
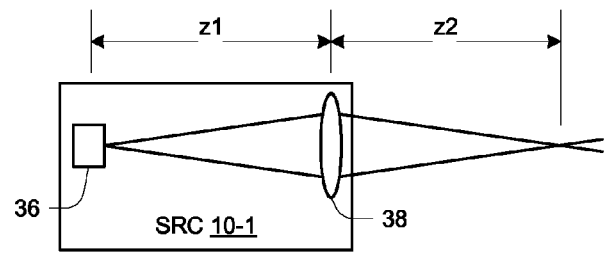
FIGS. 4 and 5 are schematic diagrams of different types of sources.
Figure 5:
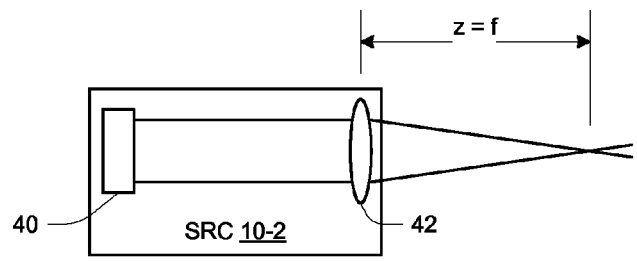

FIGS. 4 and 5 show alternative ways in which the source 10 can be realized. In FIG. 4 a first type of source 10-1 includes a point type of light source 36 and a condenser lens 38. The point light source 36 may be realized in different ways, for example by use of a nonlinear optical material in which spontaneous parametric downconversion occurs, emitting photon pairs at correlated angles. In certain embodiments, a conventional light source (e.g. incandescent bulb) followed by a pinhole screen similar to the pinhole screen 24 (FIG. 1) can be used. In these types of embodiments the distances z1 and z2 are chosen so that $$1/z1 + 1/z2 = 1/f$$

where f is the focal length of the condenser lens 38.

FIG. 5 shows a second type of source 10-2 that includes a laser 40 (or similar source of collimated light) and a condenser lens 42. In these types of embodiments the source beam 12 is focused at a location z=f from the condenser lens 42.

Figure 6:
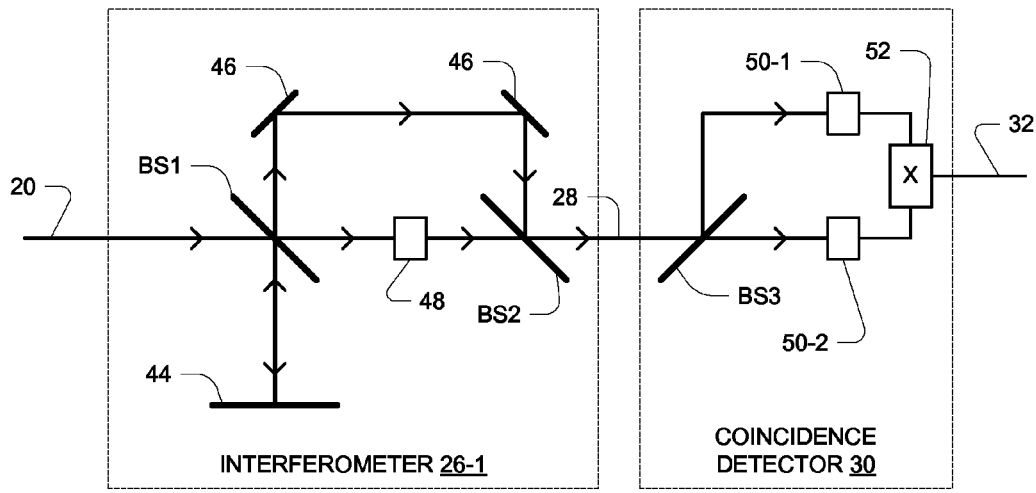
FIG. 6 is a schematic diagram of an embodiment of filter and coincidence detector.

FIG. 6 shows details of the filter 26 and coincidence detector 30 in one embodiment. The filter 26 is realized as an interferometer 26-1. The image light beam 20 is directed to a first beam splitter BS1, which directs one half of the beam 20 along a first path toward a second beam splitter BS2 and the other half to a phase conjugating mirror 44. The mirror 44 reflects incident light back toward BS 1 while reversing the sign of its phase. At BS1, the reflected beam is split again, with half being directed back toward the source and the other half being directed along a second path shown as having mirrors 46. Light from the first and second paths are combined at BS2 to form the filtered light beam 28. An amplitude equalizer 48 may be used between BS1 and BS2 to equalize the intensities of the beams in the first and second paths. The amplitude equalizer 48 may be realized using a high-density optical filter or another beam splitter, for example.

It can be shown mathematically that the filtered light beam 28 is composed primarily of highly spatially correlated photon pairs, by action of the interferometer 26-1 acting on the image beam 20 as modulated by the spatial modulator 16. In the coincidence detector 30, the beam 28 is divided by a third beam splitter BS3 and directed to two photodetectors 50-1 and 50-2. The outputs of the photodetectors 50-1 and 50-2 are sent to a multiplier 52 that generates the pulse output signal 32. The third beam splitter BS3 divides some proportion of correlated photon pairs between the two photodetectors 50-1 and 50-2, and remaining pairs are sent undivided to either photodetector 50-1 or 50-2 with equal probability. As a result, the two photodetectors 50-1 and 50-2 have simultaneous detections primarily for only spatially correlated photon pairs. The multiplier 52 asserts a non-zero output in response to temporally coincident non-zero outputs from the photodetectors 50-1 and 50-2.

While in the foregoing description the paths of the incident and gathered light are shown as separate, this depiction is schematic in nature and does not necessarily map to completely distinct physical paths in a real microscope. In particular, in many cases the microscope operates based on reflection of light from the sample, and in such a case the condenser lens 38/42 and objective lens 22 may be the same lens. Additionally, both the incident and reflected light may pass through the modulator 16, generally doubling the amplitude of the modulation applied in a single pass.

While various embodiments of the invention have been particularly shown and described, it will be understood by those skilled in the art that various changes in form and details may be made therein without departing from the scope of the invention as defined by the appended claims.

What is claimed is:

1. A correlation confocal microscope, comprising:
   a source of a source light beam converging to a point location on a sample;
   a modulator applying a spatial pattern of modulation to the source light beam to define spatially correlated photons of the source light beam by equal modulation thereof;
   an objective operative to generate an image light beam from modulated light gathered from the point location on the sample;
   a filter operative to apply a modulation-selective filter function to the image light beam to generate a filtered light beam of like-modulated photons; and
   a coincidence detector operative to detect temporally coincident photon pairs in the filtered light beam to generate a pulse output indicative of a magnitude of a light-detectable property of the sample at the point location.

2. A correlation confocal microscope according to claim 1, wherein the modulator is a phase modulator and the spatial pattern is a spatial pattern of phase modulation, and wherein the filter is an interferometer and the modulation-selective filter function selects photon pairs that are phase-coincident and rejects photon pairs that are not phase-coincident.

3. A correlation confocal microscope according to claim 2, wherein the phase modulator has a linearly varying characteristic to produce the spatial pattern of phase modulation having a linear transition as a function of distance away from an optical axis of the microscope.

4. A correlation confocal microscope according to claim 2, wherein the phase modulator has a non-linearly varying characteristic to produce the spatial pattern of phase modulation having a non-linear transition as a function of distance away from an optical axis of the microscope.

5. A correlation confocal microscope according to claim 4, wherein the non-linear transition has a Gaussian characteristic.

6. A correlation confocal microscope according to claim 1, wherein the objective includes an objective lens and a pinhole screen having a pinhole at which the modulated light is focused to form the image light beam.

7. A correlation confocal microscope according to claim 1, wherein the source includes a source of collimated light and a condenser lens, and wherein the sample is separated from the condenser lens by a focal length of the condenser lens.

8. A correlation confocal microscope according to claim 7, wherein the source of collimated light is a laser.

9. A correlation confocal microscope according to claim 1, wherein the source includes a point type of light source and a condenser lens, the condenser lens having a focal length f and being located at respective distances z1 and z2 from the point type of light source and the sample, where $1/z1+1/z2=1/f$.

10. A correlation confocal microscope according to claim 9, wherein the point type of light source includes an incoherent source and a pinhole screen having a pinhole through which light from the incoherent source travels to form the source light beam.

11. A correlation confocal microscope according to claim 9, wherein the point type of light source includes a nonlinear optical material in which spontaneous parametric downconversion occurs to emit photon pairs at correlated angles.

12. A correlation confocal microscope according to claim 1, further including scanning apparatus and image capture apparatus co-operative to effect a scanning and a collection of pixel values at each of an array of point location over an area of the sample.

13. A correlation confocal microscope according to claim 1, wherein the modulator is a frequency modulator and the spatial pattern is a spatial pattern of frequency modulation, and wherein the filter is a prism and the modulation-selective filter function selects photon pairs that are frequency-coincident and rejects photon pairs that are not frequency-coincident.

* * * * *